(12) United States Patent
Gotay

(10) Patent No.: US 8,344,536 B1
(45) Date of Patent: Jan. 1, 2013

(54) SEWER ELECTRICAL GENERATION APPARATUS

(76) Inventor: Valentino Gotay, Coram, NY (US)

( * ) Notice: Subject to any disclaimer, the term of this patent is extended or adjusted under 35 U.S.C. 154(b) by 697 days.

(21) Appl. No.: 12/552,168

(22) Filed: Sep. 1, 2009

(51) Int. Cl.
*F03B 13/00* (2006.01)
*H02P 9/04* (2006.01)

(52) U.S. Cl. .......................................................... 290/54

(58) Field of Classification Search ............... 290/54, 290/53, 43, 52
See application file for complete search history.

(56) References Cited

U.S. PATENT DOCUMENTS

| | | | |
|---|---|---|---|
| 3,785,747 A * | 1/1974 | Mayo, Jr. .................. | 415/33 |
| 4,639,190 A * | 1/1987 | Ohta .......................... | 415/129 |
| 6,509,652 B2 | 1/2003 | Yumita | |
| D487,060 S | 2/2004 | Ehrenberger | |
| 7,179,045 B2 | 2/2007 | Staggs | |
| 7,190,088 B2 | 3/2007 | Heidel | |
| 7,429,803 B2 * | 9/2008 | Davis ......................... | 290/54 |
| 2005/0285407 A1 | 12/2005 | Davis et al. | |
| 2007/0018460 A1 | 1/2007 | Williams | |

* cited by examiner

*Primary Examiner* — Javaid Nasri

(57) ABSTRACT

The sewer electrical generation apparatus provides a generator removably affixed to an existing sewer pipe with a communicating turbine disposed within the pipe. The turbine is turned by sewer flow to power the generator. The turbine blades are reversible so that the turbine is self-cleaning, an important design function, as sewage debris removal would otherwise require turbine removal.

8 Claims, 5 Drawing Sheets

SEWER ELECTRICAL GENERATION APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Energy savings has come to the forefront in today's world, as has environmental consciousness. Any process or device that can save energy and/or negate pollution and carbon output has become favorable. To that end, many inventors have pursued energy sources heretofore not considered. Energy sources that do not require the use of fuels for electrical generation or power production have sometimes been referred to as "free" energy sources in that, after installation costs and omitting maintenance costs, existing energy is used with no cost for utilizing that energy. A turbocharger for an engine uses exhaust gasses that otherwise are simply set free, for one example. Solar energy can be cited as another, as can wind and wave energies. Sewer flow exists mostly of water, and is untapped as an energy source. The present apparatus takes a unique path to energy generation that uses sewer flow for electrical generation.

FIELD OF THE INVENTION

The sewer electrical generation apparatus relates to electrical generators and more especially to an electrical generation apparatus that uses existing sewer flow to generate electricity.

SUMMARY OF THE INVENTION

The general purpose of the sewer electrical generation apparatus, described subsequently in greater detail, is to provide a sewer electrical generation apparatus which has many novel features that result in an improved sewer electrical generation apparatus which is not anticipated, rendered obvious, suggested, or even implied by prior art, either alone or in combination thereof.

To attain this, the sewer electrical generation apparatus is provided in several embodiments. Each embodiment provides a generator removably affixed to an existing sewer pipe with a communicating turbine disposed within the pipe. The turbine is turned by sewer flow to power the generator, ideally disposed outside of the sewer pipe. While the generator need not always be disposed outside of the sewer pipe in every embodiment, the external generator design provides the most economical installment with regard to access, maintenance, and original materials makeup of the generator. The generator ideally partially comprises a removable housing to further facilitate maintenance without requiring generator removal.

The turbine disposed within the sewer pipe is typically stainless steel or other non-corroding material and materials. The turbine blades are reversible so that the turbine is self-cleaning, an important design function, as sewage debris removal would otherwise require turbine removal. An external signal to the turbine directs blade pivot, a feature powered by the sewage flow. The nose cone assists in gaining all available energy from the sewage flow.

The connection of the generator and pipe-internal turbine are sized for turbine removal, as required. The generator enclosure has a lift hook disposed on the enclosure top. As some apparatus applications may be quite large, the hook facilitates enclosure removal as well as entire generator removal. The turbine housing is installed within an existing sewer pipe and is fitted within with a relatively tight clearance so that all sewage flow is used in electrical generation. In the ideal embodiment, the rotatable turbine shaft is extended from the turbine housing coplanarly to the axis of the sewer pipe. Ideally, but not required, then, the generator shaft is perpendicular to the pipe axis and engages the turbine shaft via pinion gears.

Thus has been broadly outlined the more important features of the improved sewer electrical generation apparatus so that the detailed description thereof that follows may be better understood and in order that the present contribution to the art may be better appreciated.

An object of the sewer electrical generation apparatus is to utilize a non-fuel burning source of energy to generate electricity.

Another object of the sewer electrical generation apparatus is to use an energy source heretofore untapped to create electricity.

A further object of the sewer electrical generation apparatus is to use a turbine to supply an electrical generator.

An added object of the sewer electrical generation apparatus is to provide a self-cleaning turbine.

These together with additional objects, features and advantages of the improved sewer electrical generation apparatus will be readily apparent to those of ordinary skill in the art upon reading the following detailed description of presently preferred, but nonetheless illustrative, embodiments of the improved sewer electrical generation apparatus when taken in conjunction with the accompanying drawings.

In this respect, before explaining the current embodiments of the improved sewer electrical generation apparatus in detail, it is to be understood that the sewer electrical generation apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved sewer electrical generation apparatus. It is therefore important that the claims be regarded as including such equivalent constructions insofar as they do not depart from the spirit and scope of the sewer electrical generation apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the sewer electrical generation apparatus generally designated by the reference number 10 will be described.

Figure 1:
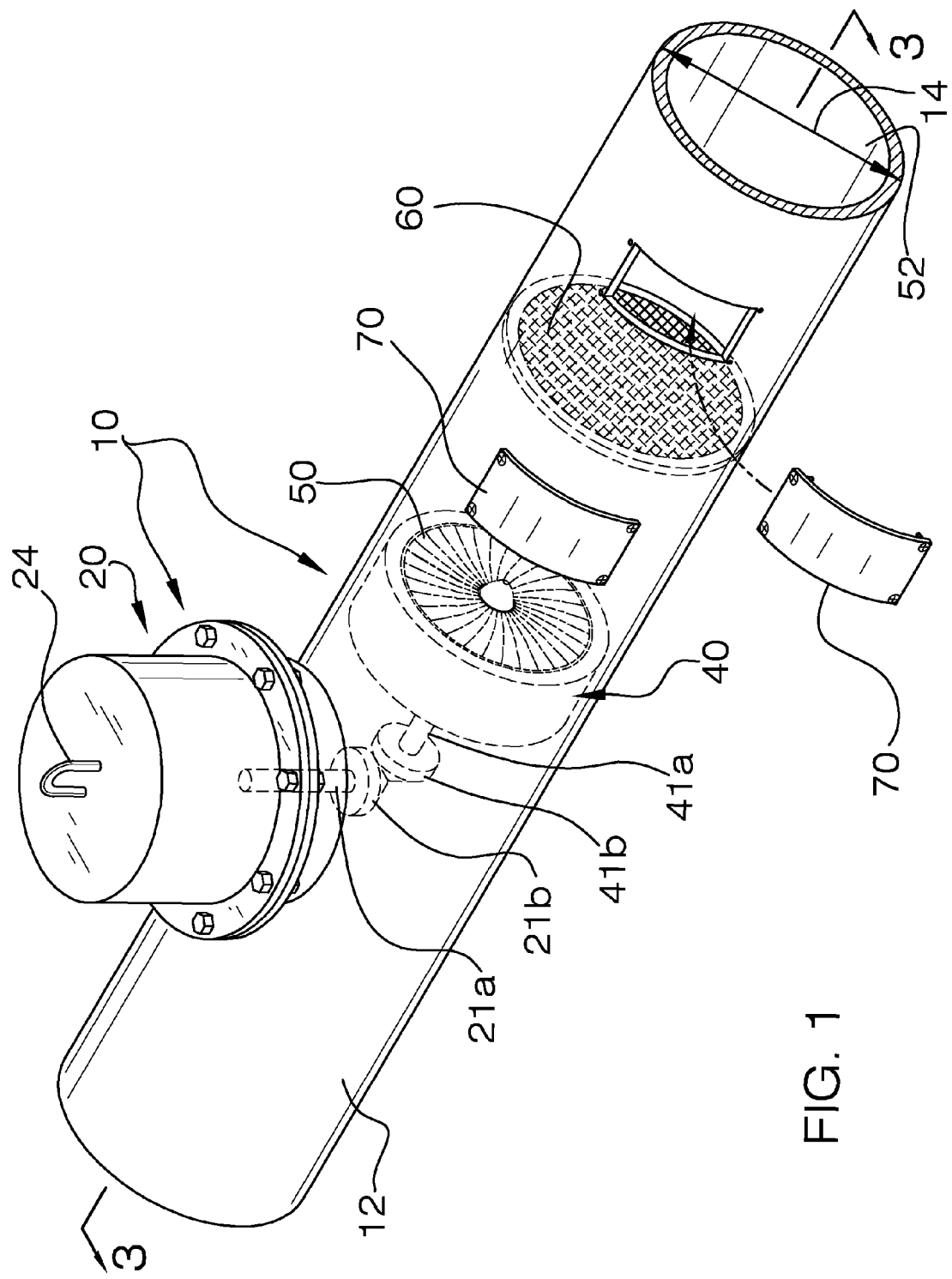
FIG. 1 is a perspective view of the installed apparatus.
Figure 2:
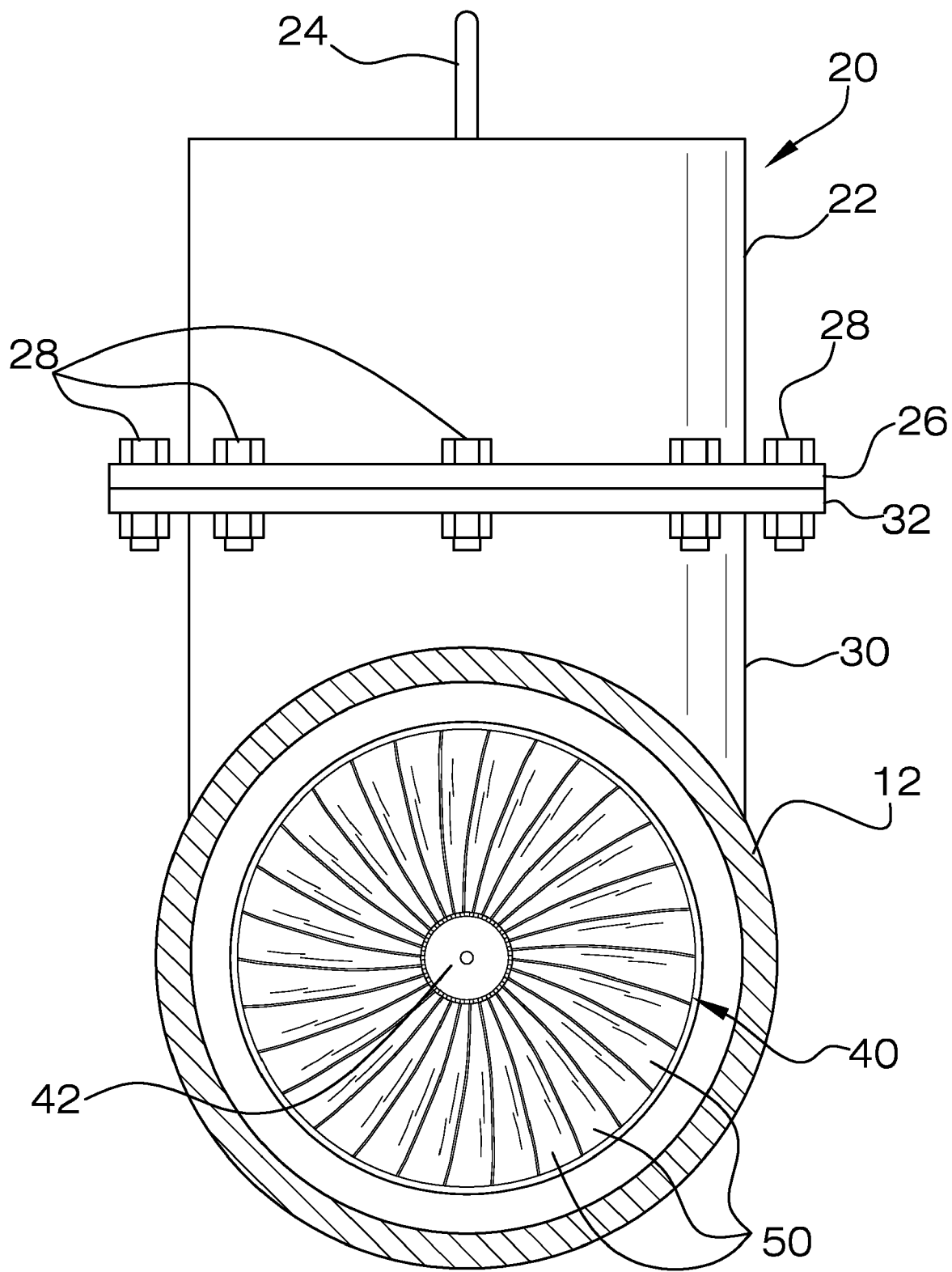
FIG. 2 is a front elevation view of the apparatus.
Figure 3:
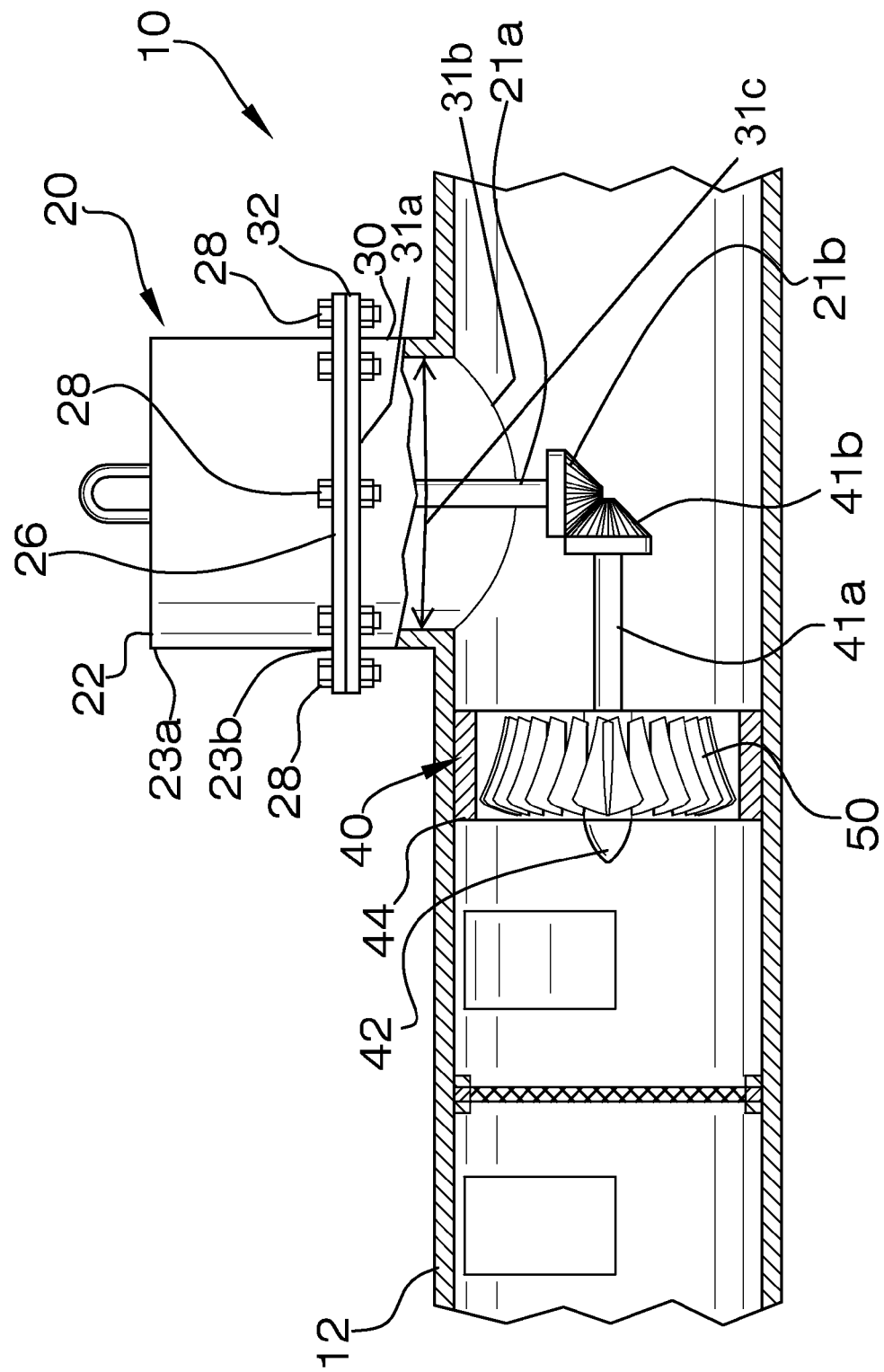
FIG. 3 is a cross sectional view of FIG. 1, taken along the line 3-3.

Referring to FIGS. 1, 2, and 3, the apparatus 10 partially comprises the generator 20. The generator 20 is surrounded by an enclosure 22. The enclosure 22 has a top 23a spaced apart from a bottom 23b. The lift hook 24 is disposed on the enclosure 22 top 23a and provides for easiest lift of the removable enclosure 22 or even the entire generator 20. The enclosure flange 26 is disposed on the bottom 23b. The connecting pipe 30 has a pipe top 31a spaced apart from the pipe bottom 31b. The pipe flange 32 is disposed on the pipe top 31a.

The pipe flange 32 is removably connected to the enclosure flange 26 via a plurality of identical fasteners 28. The pipe bottom 31b is connected to an existing sewer pipe 12. The pipe diameter 31c is equal to the sewer pipe diameter 14. The two identical spaced apart access panels 70 are provided to gain access to the supplied screen filter 60 that aids in keeping debris off of the turbine 40.

Referring again to FIG. 3, the rotatable generator drive shaft 21a is connected to the generator 20. The generator drive shaft 21a is partially disposed within the sewer pipe 12. The generator pinion gear 21b is connected to the generator drive shaft 21a. The turbine 40 has a housing 44. The housing 44 is installed within the sewer pipe 12. The rotatable turbine shaft 41a is extended from the turbine 40 housing 44. The turbine pinion gear 41b is affixed to the turbine shaft 41a. The turbine pinion gear 41b is engaged with the generator pinion gear 21b. The nose cone 42 is disposed on the turbine shaft 41a. The nose cone 42 is opposite and spaced apart from the turbine pinion gear 41b. The nose cone 42 is adjacent to the turbine 40 housing 44.

Figure 4:
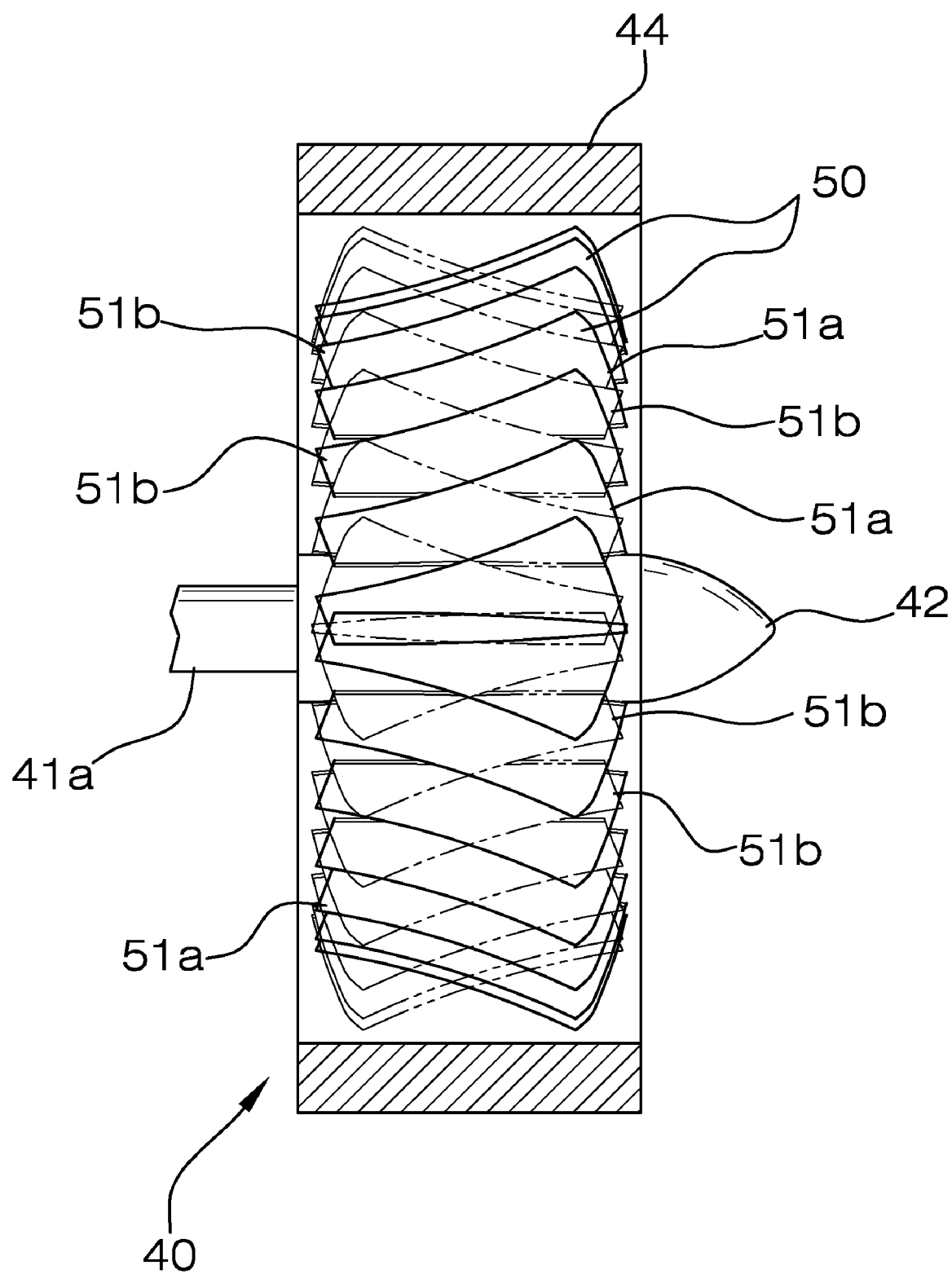
FIG. 4 is a view of the turbine of FIG. 3.
Figure 5:
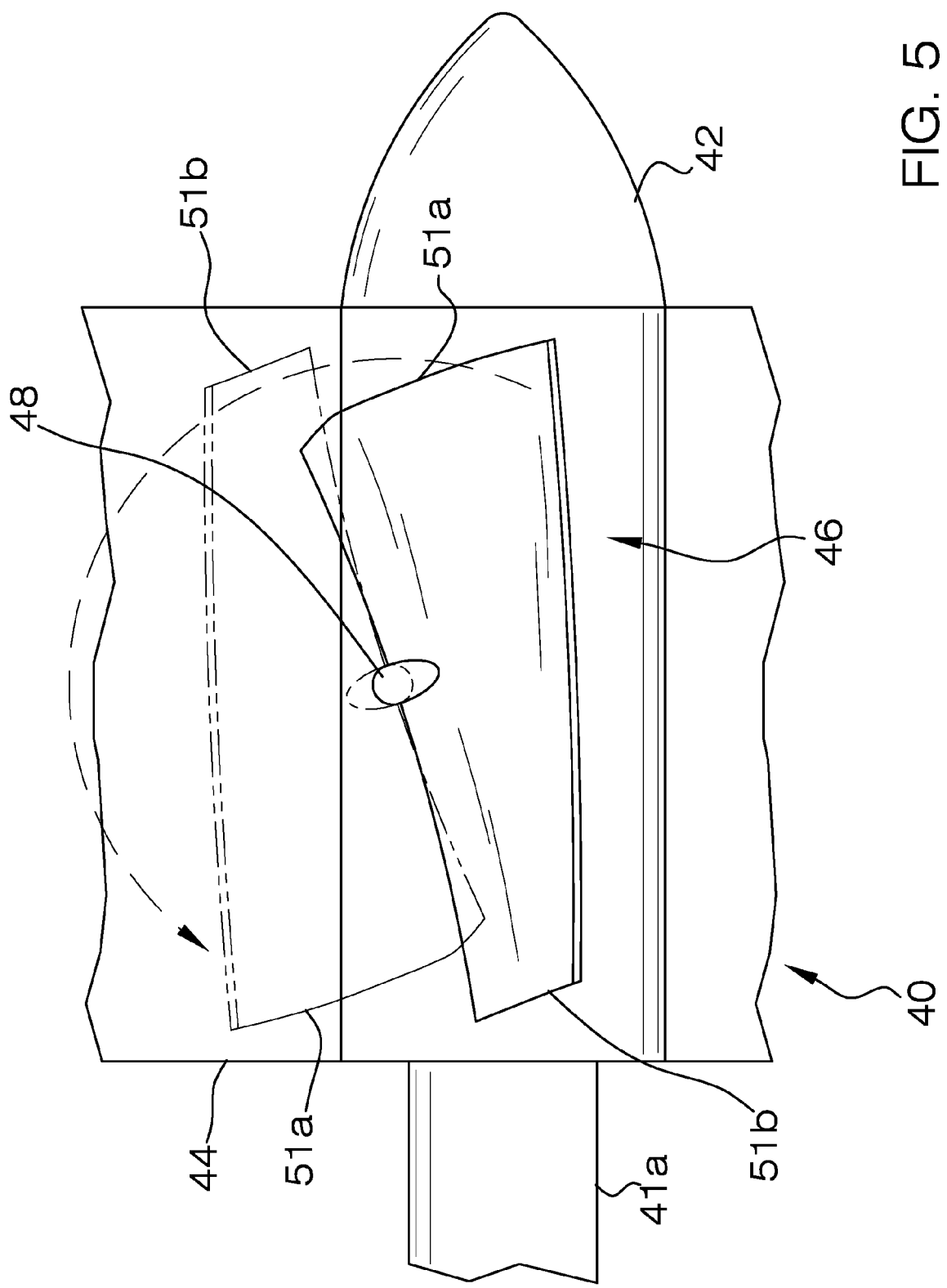
FIG. 5 is a view of a blade assembly of the turbine.

Referring to FIGS. 4 and 5, the plurality of blade assemblies 46 is disposed within the housing 44. Each blade assembly 46 comprises a blade 50 having a leading edge 51a spaced apart from a trailing edge 51b. The pivot 48 attaches each blade 50 to the turbine shaft 41a. The pivot 48 provides 180 degrees pivot of the blade 50. As is depicted, the blades 50 can therefore be disposed with the leading edge 51a facing either into the direction facing the intake 52 or in the direction coincidental with intake 52 flow and exit.

Leading edge 51a facing the intake 52 provides for the turbine 40 to be driven in normal operating mode, turning the generator 20 to generate electricity. Although not shown, the generator 20 is electrically coupled to an external grid for power delivery and communication. Upon command external to the apparatus 10, the blades 50 are reversed such that the trailing edge 51b faces the intake 52. This provides for self-cleaning of debris from the blades 50, an important function of the apparatus 10 so that physical maintenance in the harsh sewage environment is negated and so that power generation is optimized.

With respect to the above description then, it is to be realized that the optimum dimensional relationships for the parts of the sewer electrical generation apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the sewer electrical generation apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the sewer electrical generation apparatus may be used.

Therefore, the foregoing is considered as illustrative only of the principles of the sewer electrical generation apparatus. Further, since numerous modifications and changes will readily occur to those skilled in the art, it is not desired to limit the sewer electrical generation apparatus to the exact construction and operation shown and described, and accordingly, all suitable modifications and equivalents may be resorted to, falling within the scope of the sewer electrical generation apparatus.

What is claimed is:

1. A sewer electrical generation apparatus, comprising, in combination:
    a generator;
    means for connecting the generator to an existing sewer pipe of a sewer line;
    a rotatable generator drive shaft connected to the generator, the generator drive shaft partially disposed within the sewer pipe;
    a turbine having a housing, the housing installed within the sewer pipe;
    a rotatable turbine shaft extended from the turbine housing;
    means for connecting the turbine shaft to the generator shaft;
    a plurality of blade assemblies disposed within the turbine housing, each blade assembly comprising a plurality of blades, each blade selectively pivotable 180 degrees coaxially to the turbine shaft.

2. The apparatus according to claim 1 further comprising a nose cone disposed on the turbine shaft, the nose cone opposite and spaced apart from the means for connecting the turbine shaft to the generator shaft, the nose cone adjacent to the turbine housing, the nose cone foremost in meeting an intake of the sewer pipe.

3. A sewer electrical generation apparatus, comprising, in combination:
    a generator;
    an enclosure surrounding the generator, the enclosure having a top spaced apart from a bottom;
    means for connecting the generator enclosure to an existing sewer pipe of a sewer line;
    a rotatable generator drive shaft connected to the generator, the generator drive shaft partially disposed within the sewer pipe;
    a generator gear connected to the generator drive shaft;
    a turbine having a housing, the housing installed within the sewer pipe;
    a rotatable turbine shaft extended from the turbine housing;
    a turbine gear affixed to the turbine shaft, the turbine gear engaged with the generator gear;
    a plurality of blade assemblies disposed within the turbine housing, each blade assembly comprising:
        a blade having a leading edge spaced apart from a trailing edge;
        a pivot attaching the blade to the turbine shaft, whereby each blade is pivotal 180 degrees.

4. The apparatus according to claim 3 further comprising a lift hook disposed on the enclosure top.

5. The apparatus according to claim 4 further comprising a nose cone disposed on the turbine shaft, the nose cone opposite and spaced apart from the turbine gear, the nose cone adjacent to the turbine housing.

6. The apparatus according to claim 3 further comprising a nose cone disposed on the turbine shaft, the nose cone opposite and spaced apart from the turbine gear, the nose cone adjacent to the turbine housing, the nose cone foremost in meeting an intake of the sewer pipe.

7. A sewer electrical generation apparatus, comprising, in combination:
   a generator;
   a removable enclosure surrounding the generator, the enclosure having a top spaced apart from a bottom;
   a lift hook disposed on the enclosure top;
   an enclosure flange disposed on the bottom;
   a connecting pipe having a pipe top spaced apart from a pipe bottom;
   a pipe flange disposed on the pipe top, the pipe flange removably connected to the enclosure flange; the pipe bottom connected to an existing sewer pipe of a sewer line;
   a rotatable generator drive shaft connected to the generator, the generator drive shaft partially disposed within the sewer pipe, the generator shaft perpendicular to an axis of the existing sewer pipe;
   a generator pinion gear connected to the generator drive shaft;
   a turbine having a housing, the housing installed within the sewer pipe;
   a rotatable turbine shaft extended from the turbine housing, the turbine shaft coaxial with the axis of the existing sewer pipe;
   a turbine pinion gear affixed to the turbine shaft, the turbine pinion gear engaged with the generator pinion gear;
   a nose cone disposed on the turbine shaft, the nose cone opposite and spaced apart from the turbine pinion gear, the nose cone adjacent to the turbine housing, the nose cone foremost in meeting an intake of the sewer pipe;
   a plurality of blade assemblies disposed within the turbine housing, each blade assembly comprising:
      a blade having a leading edge spaced apart from a trailing edge;
      a pivot attaching the blade to the turbine shaft, the pivot providing 180 pivot of the blade;
   a pair of identical removable spaced apart access panels disposed between the turbine and the intake;
   a removable filter disposed prior to the turbine, between the access panels.

8. The apparatus according to claim 7 further comprising a pipe diameter equal to a sewer pipe diameter of the existing sewer pipe.

* * * * *